United States Patent [19]

Theosabrata

[11] Patent Number: 5,314,077
[45] Date of Patent: May 24, 1994

[54] STORAGE RACK

[76] Inventor: Yos S. Theosabrata, 377 S. Lemon Ave., Ste. E, Walnut, Calif. 91789

[21] Appl. No.: 19,064

[22] Filed: Feb. 18, 1993

[51] Int. Cl.$^5$ ............................................. A47F 7/00
[52] U.S. Cl. ...................................... 211/40; 211/41
[58] Field of Search .................. 211/40, 41, 184, 71, 211/59.4; 312/9.9, 9.63

[56] References Cited

U.S. PATENT DOCUMENTS

| D. 160,015 | 9/1950 | Rauch et al. ............... 211/40 X |
| 544,138 | 8/1895 | Ullrich . |
| 556,394 | 3/1896 | Yawman . |
| 983,342 | 2/1911 | Bauer . |
| 1,107,985 | 8/1914 | Moskowitz . |
| 1,888,141 | 11/1932 | Ovth ....................... 211/41 |
| 3,814,493 | 6/1974 | Radke . |
| 4,153,311 | 5/1979 | Takahashi . |
| 4,217,012 | 8/1980 | Klaus . |
| 4,279,454 | 7/1981 | Koiso et al. . |
| 4,389,078 | 6/1983 | Streit . |
| 4,715,669 | 12/1987 | Baillie et al. . |
| 5,199,577 | 4/1993 | Curtis ...................... 211/41 X |

FOREIGN PATENT DOCUMENTS

1176820 6/1957 France .

Primary Examiner—Robert W. Gibson, Jr.
Attorney, Agent, or Firm—Knobbe, Martens, Olson & Bear

[57] ABSTRACT

A storage rack for audio-visual or other articles having a base and a top plate supported by three vertical columns affixed in a triangular pattern in the base. Flexible, V-shaped members are sized to fit in cavities on the inner sides of the three columns to define planes of support for the articles to be stored. Alternating flexible members may be removed to provide storage space for thicker articles. The planes of support may be horizontal or adjusted at different upward angles to better view the ends of the articles from above.

14 Claims, 8 Drawing Sheets

STORAGE RACK

BACKGROUND OF THE INVENTION

The present invention relates to storage racks, and more particularly to a storage rack for holding a plurality of recorded articles such as compact discs (CD's), video tapes, audio tapes, computer disks, etc.

With the recent transition of loyalties from vinyl records to CD's, there has been an explosion of demand for handy storage units for these articles. A common means for storing CD's has been to array them along an exposed shelf with a front bar adapted to uplift the front corner of the CD's and retain them on the shelf. Unfortunately, the shelves are either wall mounted or rest on table tops and are not designed to be easily moved when filled with CD's. Furthermore, the CD's are arrayed against each other on their sides, making it difficult to read the titles and separate the CD's easily. Typical horizontal storage means have provided a simple box-like frame which supports shelves on which the CD's lie. These are often bulky due to the outer frame.

Another common problem with prior CD storage units has been their relative inflexibility with regard to receiving both single and double CD's. Double CD's, having approximately twice the thickness of single CD's, will not fit in a storage rack sized only for single CD's. Some manufacturers have introduced shelving which provides one or two spaces for double CD's and the rest for single CD's. This is limiting, especially for opera and classical music aficionados whose CD purchases are more often than not CD packages with two or more CD's included.

Due to the drawbacks of prior art storage racks, there is a need for an improved rack which is both lightweight and has a large storage capacity. Moreover, there is a need for a lightweight, mobile storage rack with a large CD storage capacity which may be placed on the floor or on a desk or table. Finally, there is a need for a storage rack with all of the aforementioned features which can be cheaply made and is easily adapted to store various sized CD boxes.

SUMMARY OF THE INVENTION

The present invention provides a storage rack comprising a base and three vertical columns or shafts secured on the base, the shafts defining a plurality of stations. The storage rack includes a number of support members each sized and shaped to extend between a station on all three shafts.

In a preferred embodiment of the present invention, the stations comprise cavities aligned in a Vertical column and sized and shaped to receive and retain a portion of the support members. Each cavity in the column of cavities in one shaft is positioned a distance above the base equal to that of the corresponding cavities in the other shafts. The support members are sized and shaped to be capable of being retained within corresponding cavities in first and second shafts while being retained in any one of three cavities in a third shaft.

In accordance with a further preferred embodiment, the present invention comprises a storage cabinet having a base and three upstanding columns or shafts, each of the shafts defining a plurality of stations. A number of support members sized and shaped to be retained by one of the stations on each of the shafts are positioned such that support members retained within adjacent stations are spaced apart a sufficient distance to support thin articles. Advantageously, the support members are manually removable to permit support members retained by non-adjacent stations to support thicker articles.

In accordance with the present invention, the present invention provides a storage rack with a base and top supported on the base by three upstanding columns. The columns are advantageously disposed in a triangular pattern between the base and top with two front columns in a line parallel to the front edge of the base and the third column, or apex of the triangle, proximate the center of the rear edge. In this arrangement, supports for storing a vertical array of articles, such as compact discs, audio and video tapes or digital media, are disposed between the columns so that one edge of the articles are displayed facing out between the front two columns.

The supports for storing articles within the rack includes a plurality of removable rods which may be arranged to hold varying thicknesses of articles. The rods extend between the rear column and the front two columns in a plane. The rods are inserted into cavities defining article support stations, or held by other fastening devices, which are spaced apart corresponding vertical distances along the entire length of all three columns. Preferably, the rods are made of an inexpensive flexible material such as polypropylene.

In a still further preferred embodiment according to the present invention, each support member is defined by a unitary member which extends between the three columns. The member forms a V-shape with the legs having an arcuate configuration. The ends of the legs fit into cavities in the front two columns while the apex fits into a cavity in the rear column. The legs of the resilient members are sized slightly larger than the distance between the columns, and thus must be bent inward to fit therebetween, whereupon the inward pressure on the legs is relaxed and the legs flex outward to be aligned with the cavities.

To avoid jamming of the V-shaped member in the cavities, each leg and the apex are provided with slightly narrowed end tabs to extend into the cavities. Thus, the shoulders at the transition of the tabs to the main body of the flexible member abut the corner edges of the cavities and prevent the member from lodging therein. The tabs are of a sufficient diameter to support the weight of the particular articles to be stored.

The resiliency and flexibility of the V-shaped member, and the arcuate shape of the legs, allow the members to easily be removed from the three-point supports. This advantageous flexibility of movement is particularly suited for storing either thin or thick articles such as single and double CD's, respectively. To store thicker articles, alternating V-shaped members are removed leaving larger storage stations.

The storage rack of the present invention may be assembled to store articles in horizontal positions. In this case, the three cavities into which the V-shaped member inserts will lie in a horizontal plane. Alternatively, and facilitated by the flexibility of the arcuate legs, the apex of the V-shaped member will be inserted into the next lower cavity in the rear column than the legs are in the front two columns. Thus, the articles are stored at a slight angle so that their front ends are higher than their rear ends. This is preferred if the storage rack is placed on the ground to more easily identify from above any labeling on the front ends, such as, for instance, compact disc titles. Advantageously, the apex of the V-shaped member may also be inserted into a cavity in the rear column which is two cavities below those that the front legs are inserted in. In this manner, an even greater angle of storage may be obtained. Preferably, the size of the V-shaped member in combination with the spacing between cavities is such that articles may be stored in a horizontal plane, at an angle of approximately 10° or at an angle of approximately 20°.

In accordance with a further aspect of the present invention, the storage rack may provide storage spaces for a plurality of vertical arrays of compact discs or other articles. A storage rack having a capacity for storing two vertical arrays of articles has three shafts proximate the front edge of the base and two rear shafts proximate the rear edge of the base. One aligned vertical column of cavities is provided in each of the rear shafts and the front outermost two shafts. The middle front shaft includes two columns of aligned cavities so that the front middle shaft provides a support for the flexible V-shaped members in two vertical CD storage arrays. Likewise, more than two vertical CD storage arrays may be provided in a single storage rack with only the two outermost front columns having a single row of cavities.

DETAILED DESCRIPTION OF THE INVENTION

Figure 1:
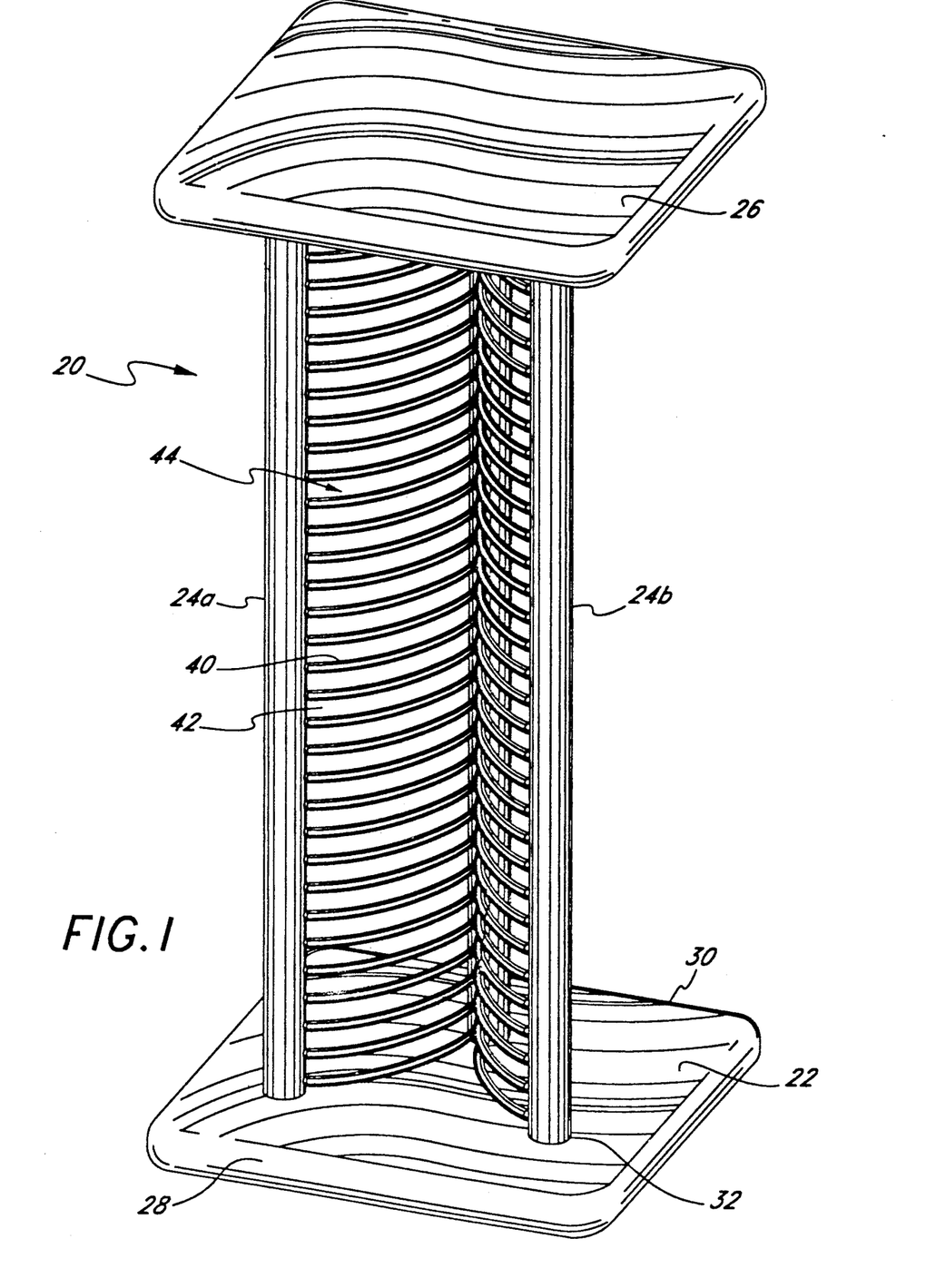
FIG. 1 is a perspective view of the storage rack of the present invention.

The storage rack 20 of the present invention as shown in FIG. 1 is a free-standing piece of furniture designed to store a number of articles in a minimum of floor space. It is possible to store numerous types of articles in the storage rack 20 of the present invention, and thus the size parameters given herein are for example only and not meant to limit the invention. In general, however, the storage rack 20 functions best as a tall, narrow piece of furniture adapted to hold a number of lightweight articles such as flat, rigid cases holding compact discs (CD's).

Referring to FIG. 1, the storage rack 20 is shown standing upright on a base 22. Three vertical columns 24a-c or shafts extend upward from the base 22 and are joined by a top 26. The columns 24 form an equilateral triangle pattern on the base 22 with two columns 24a, 24b in a line parallel and proximate to a front edge of the base 28 and the third column 24c, forming the apex of the triangle, proximate the center of a rear edge of the base 30. The top 26 attaches to the upper ends of the three columns 24 as a substantially mirror image of the base 22.

Figure 2:
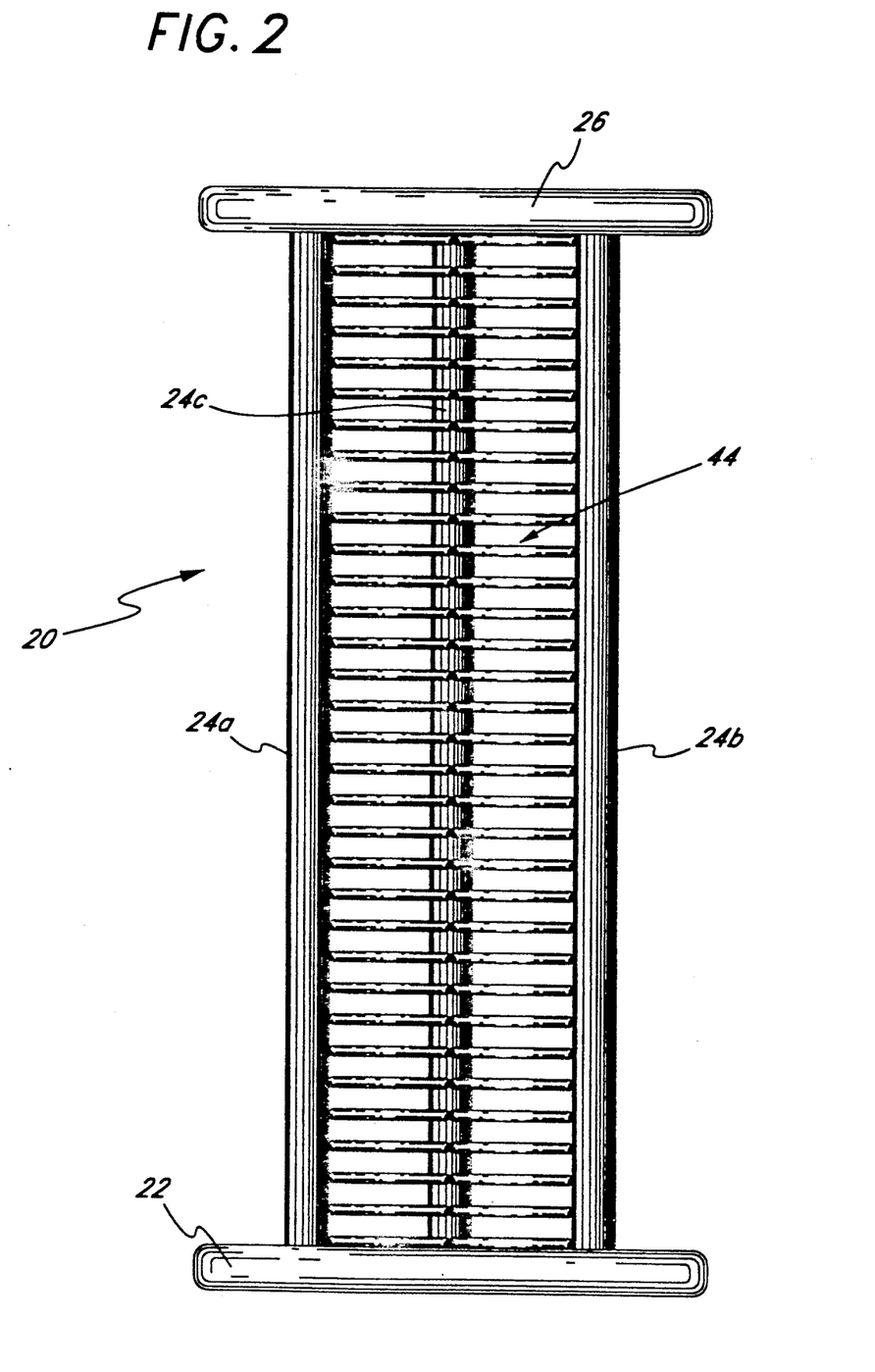
FIG. 2 is a front elevational view of the storage rack.

In reference to FIGS. 1 and 2, the base 22 and top 26 comprise generally flat, rectangular plates. The outside edges 34 of the base 22 and top 26 are rounded to remove any sharp corners which might wear or chip away upon extended use, or would present a sharp protrusion for one to stub a toe on, for instance. The length and width of the base 22 and top 26 depend on the type of articles stored within, but are typically square, as are CD packages. The three columns 24 are shown in the drawings in a substantially centered position on the base 22, however, other arrangements are possible.

For instance, the front edge 28 of the base 22 may extend several inches farther forward from the front two columns 24a, 24b than the back edge 30 does in a rearward direction. The extension of the base 22 in this manner helps prevent tall racks from tipping forward. The back edge 30 is desirably closer to the third column 24c to allow the rack 20 to be positioned closer to an interior wall. Normally, the storage rack 20 stands proximate such a wall, or in a corner of a room, and thus is prevented from falling over backwards by such structural barriers.

The base 22 and top 26 may also have a larger shape for supporting a plurality of groups of columns 24a-c, each column group designed to hold a vertical array of CD's. Thus, the width of the base 22 and top 26 may be approximately two or more times the size shown in the drawings for supporting two or more vertical arrays of CD's.

The columns 24 securely mount in holes 32 in the base 22 and top 26 with adhesive. Alternatively, screws or bolts (not shown) may extend upward through the base 22 or downwards through the top 26 into the ends of the columns 24 within the holes 32. In addition, an intermediate mounting plate (not shown) may be affixed to both the top 26 and base 22 and the holes for receiving the columns 24 drilled into these intermediate plates. In the preferred embodiment, the columns 24 and holes 32 are cylindrical for ease of machining the holes. The simplified shapes of the components of the present invention are chosen to lower the cost of manufacture only and are not considered limiting structural features. For example, the columns could be polygonal in cross-section and mount to the base with removable clips. Likewise, the base 22, top 26 and columns 26 may be constructed from any suitable material such as wood, plastic, fiberglass, metal, composites, etc. Preferably, for its aesthetic value, cost and weight advantages, the rack 20 is fabricated from wood.

The columns 24 extend upward a height dependent on the number and type of articles stored within. Varying sizes are contemplated with a corresponding effect on the end cost, the limiting height restriction only relating to the vertical stability of the rack 20 in use. Support means, such as a bracket (not shown), may be provided to affix the top 26 to an adjacent wall adding stability and an earthquake safety feature.

The storage rack 20 contains members stacked vertically for supporting articles such as compact disc cases, video boxes, tape boxes, floppy disks or diskettes, books, etc. In the embodiment shown in FIG. 1, the members comprise rows of horizontal rods 40 supported between the columns. The rack 20 comprises aligned pairs of rods 40, between either of the front columns 24a, 24b and the center rear column 24c.

Figure 4:
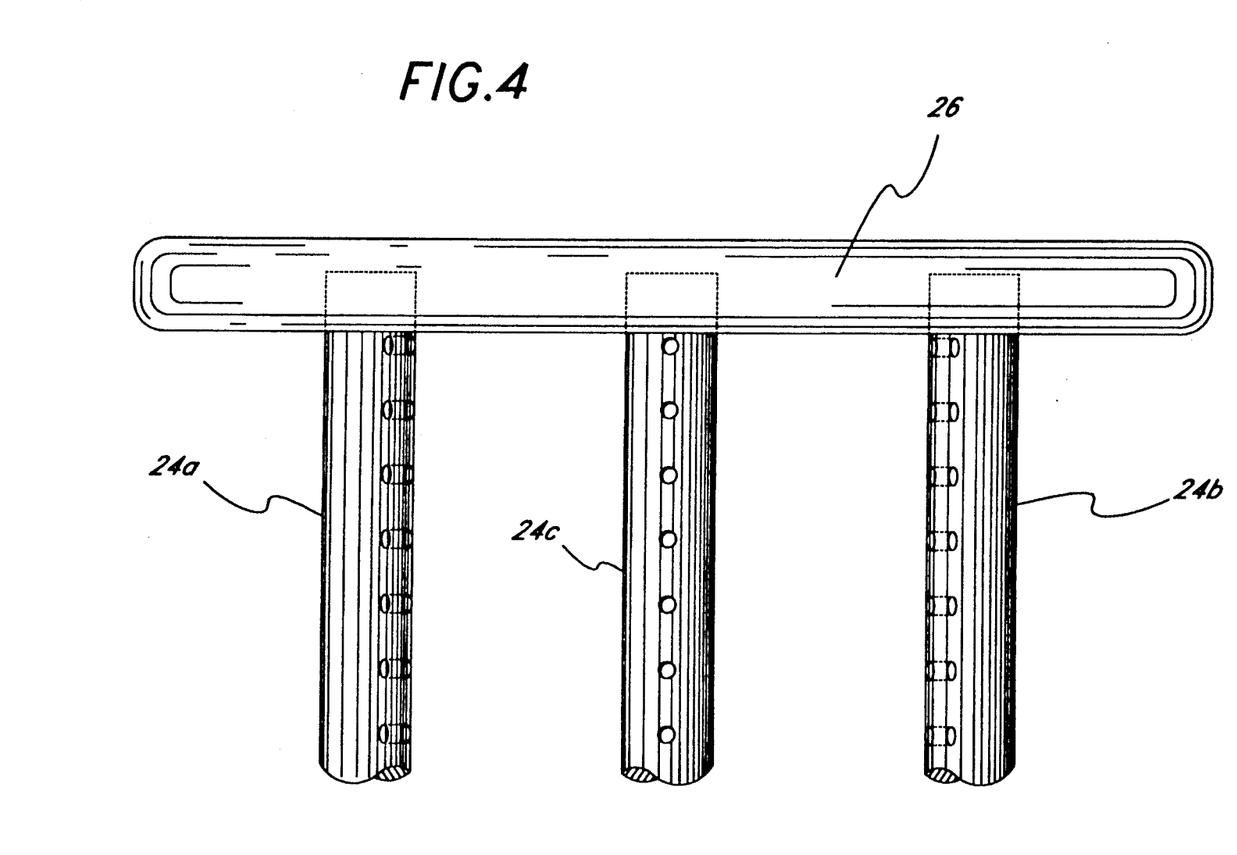
FIG. 4 is a partial front elevational view of the storage rack showing the preferred spacing of the cavities and attachment of columns to either the top or the base.
Figure 7:
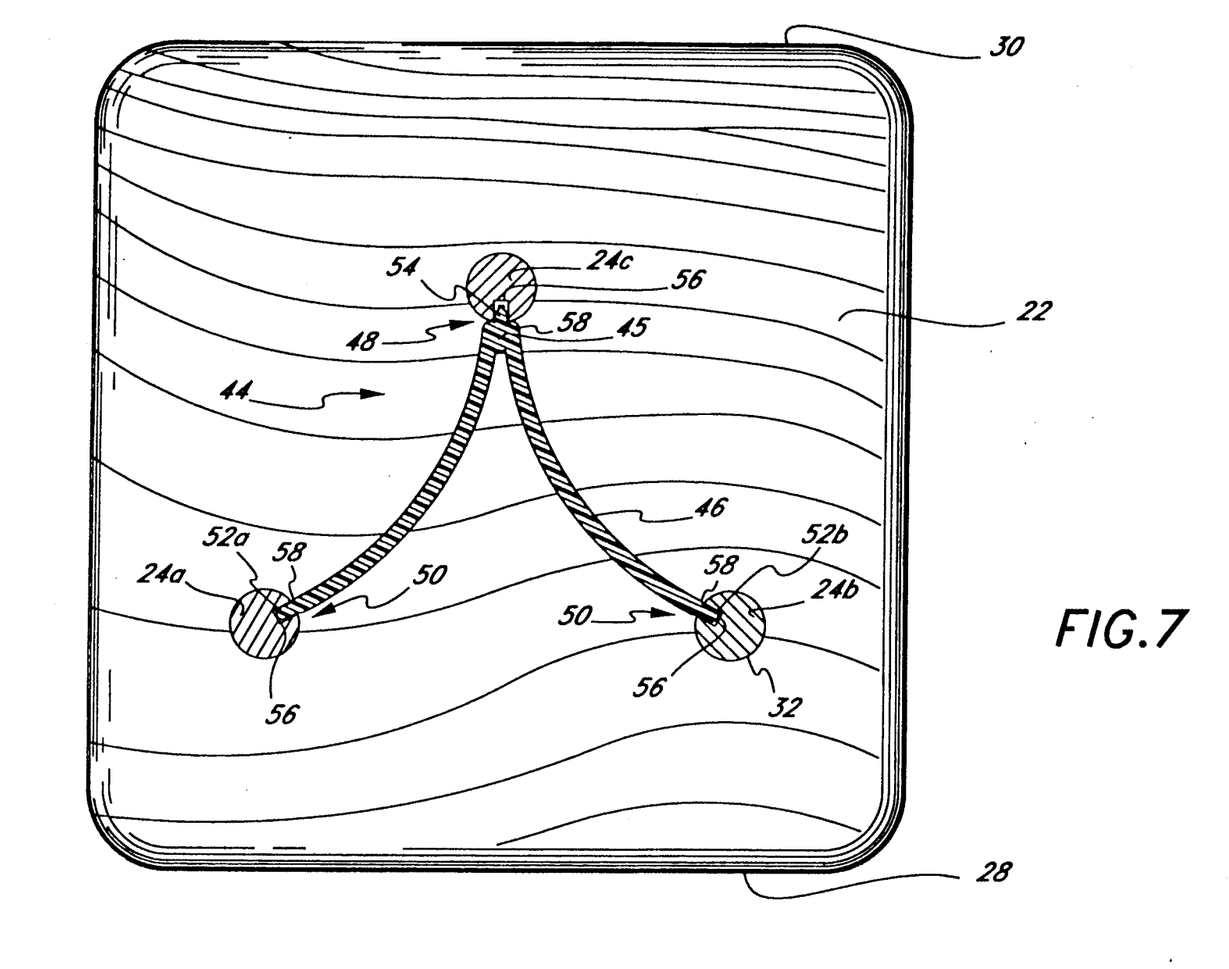
FIG. 7 is a cross-sectional view of the storage rack along lines 7—7 of FIG. 3 showing the V-shaped support member.

As best seen in FIG. 4, each of the columns 24 include aligned vertically spaced cavities 56. Preferably, there is a cavity at the same elevation on each of the columns 24. Referring now to FIG. 7, the cavities 56 in the rear column 24c extend straight out towards the front edge 28 of the base. The cavities 56 in the front columns 24a, 24b open towards the middle of the storage rack 20 at a slight rearward angle of approximately 30° from the line along the front edge 28. The cavities 56 are sized so as to receive ends of rods 40 and support the rods between the columns. A combination of three cavities 56, one on each column 24, defines an article support station 42. When positioned within a station 42, each pair of rods 40 defines a V-shaped support member for storing the articles from the front. The rods are preferably joined at the rear as will be discussed infra The articles are placed on the pairs of rods 40 between the front two columns 24a, 24b and slid rearward to rest against the rear column 24c.

Figure 3:
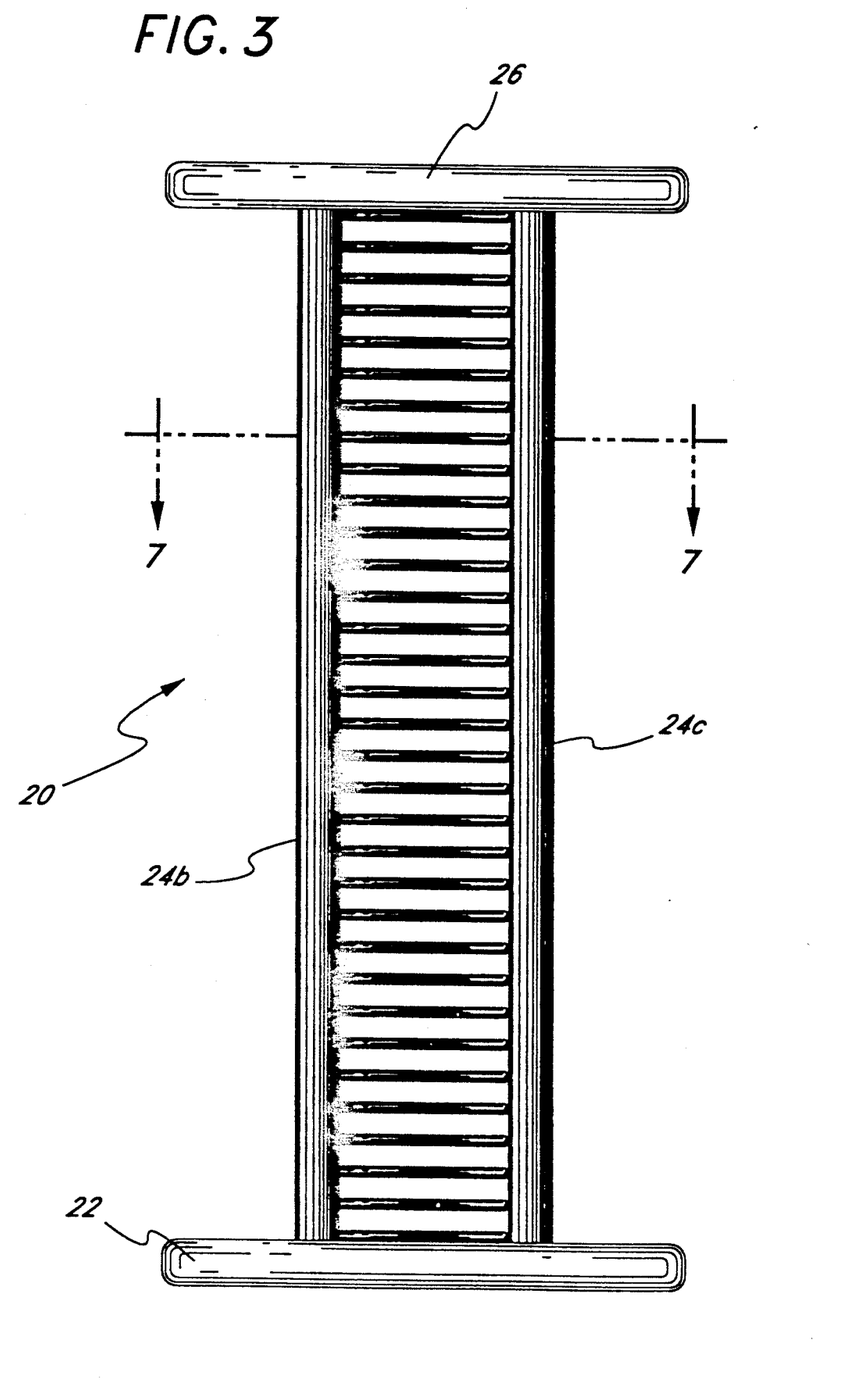
FIG. 3 is a side elevational view of the storage rack.

As shown in FIGS. 1-3, aligned pairs of rods 40 are spaced apart even distances from the base 22 to the top 26 in horizontal planes. The rods 40 are separated a vertical distance to allow space for freely sliding the particular article therebetween. Each article is supported from underneath by the two rods 40.

Figure 5:
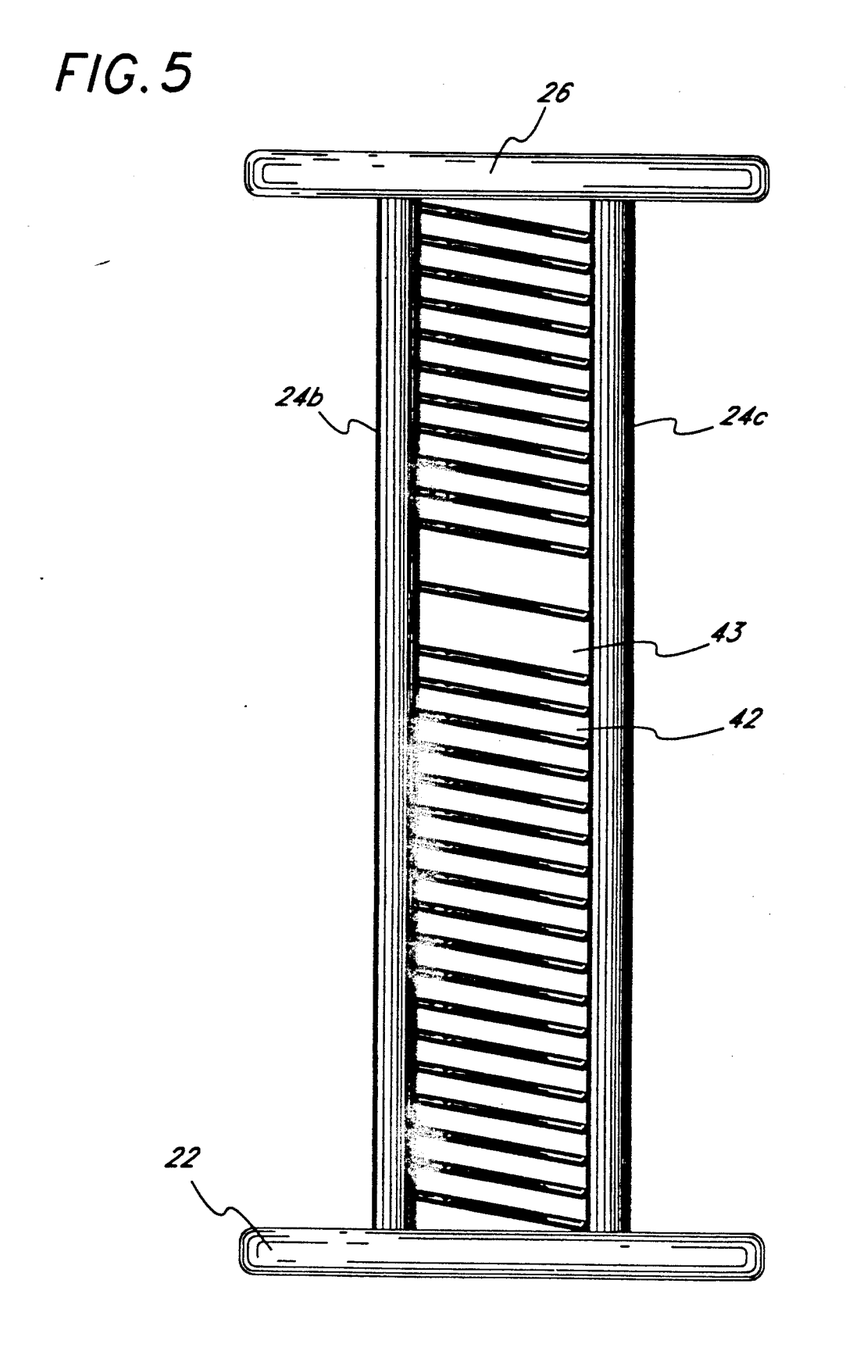
FIG. 5 is a side elevational view of the storage rack in an alternative configuration with the supports arranged at an angle.

Referring now to FIG. 5, an alternative configuration is shown wherein the stations 42 are angled downward from front to back. This provides an angled placement of the articles to more easily read titles on the front edge of the articles from above. Such a situation is typical when storing CD's in a free-standing rack. The rods 40 are somewhat flexible and are supported by the column stations 42 so that they may easily be angled in this manner, as will be more fully described with reference to FIG. 7.

FIG. 5 also illustrates an important feature of the storage rack 20 of the present invention allowing the storage of articles of various thickness. Specifically, the spaces 43 are formed for receiving thicker articles by removing one or more of the support rods 40. Naturally, removing one level of rods 40 will create a space 43 twice as large as the space between rods placed in adjacent stations. Likewise, removing two sets of adjacent rods 40 creates a space three times as large. Such storage spaces may be used to hold thicker articles such as double or triple compact disk packages.

Figure 6:
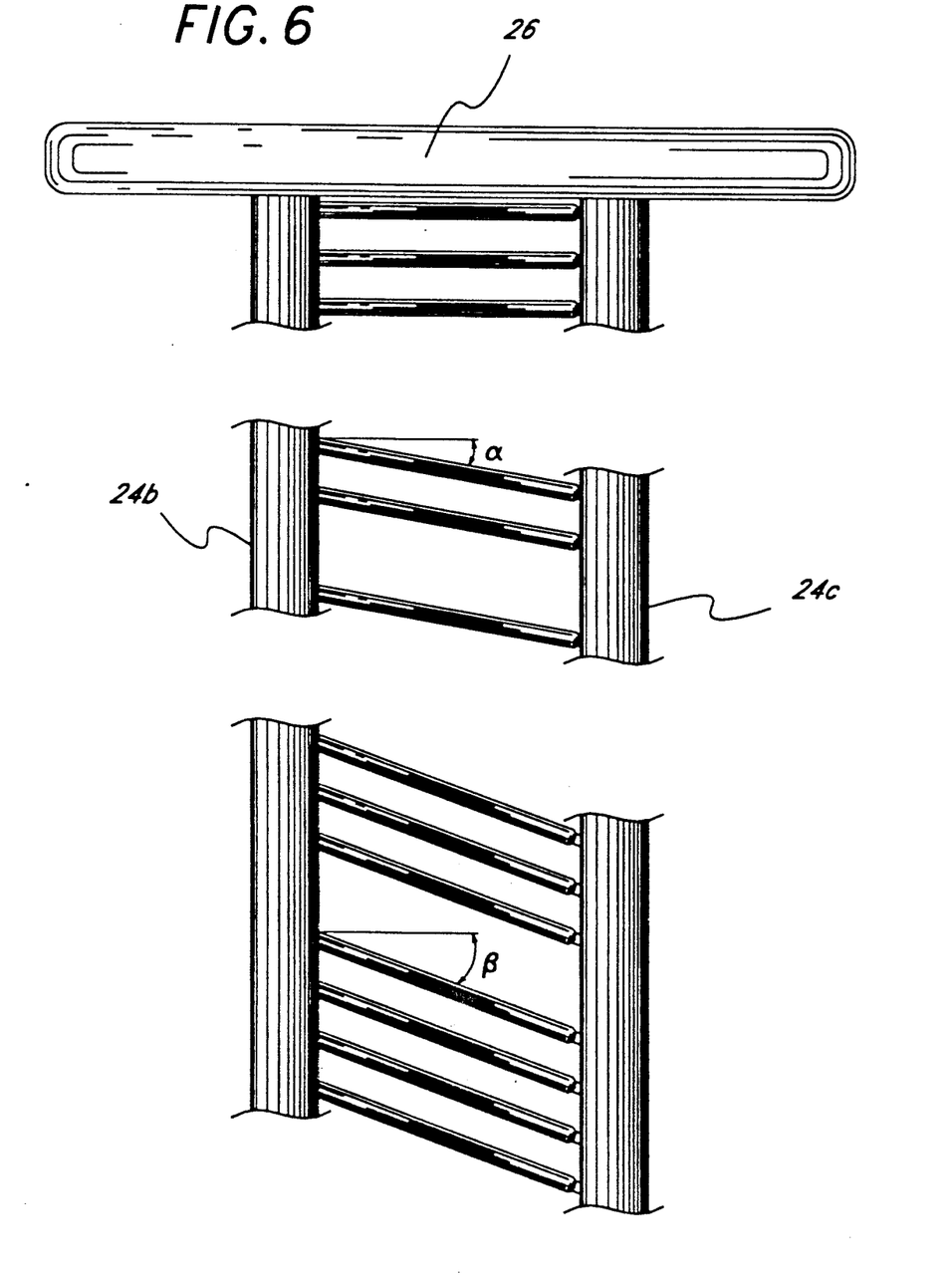
FIG. 6 is a detail side elevational view with three distinct regions showing various storage angles available and showing several supports removed to enable storage of thicker articles.

Now referring to FIG. 6, the storage rack 20 is divided into an upper, a middle, and a lower region within which the stations 42 are disposed at different angles. As shown in the upper section, the rods 40 extend between the columns 24 substantially horizontally and thus are supported by cavities 56 at the same elevation in each column. The middle section shows the rods 40 disposed within cavities 56 at the same elevation in the front two columns 24a (not shown) and 24b yet angled downward in the rear so as to be inserted into a cavity in the rear column 24c, which is one below those in the front column. Thus, the rods 40 and corresponding station 42 make an angle $\alpha$ with the horizontal. Preferably, the angle $\alpha$ is approximately 10°. As seen in the lower section, the rods 40 extend into a cavity 56 in the rear column 24c which is spaced two below the supporting cavities in the front columns 24a and 24b. Thus, the stations 42 make an angle $\beta$ with the horizontal. Preferably, the angle $\beta$ is approximately 20°.

As seen in FIG. 5, and the lower and middle regions of FIG. 6, rods 40 may be removed to create spaces 43 for storing larger articles. The rods 40 defining one station 42 are simply removed to create a space 43 equal to at least a two article thickness between the adjacent pairs of rods.

The present invention encompasses any number and combination of sizes of stations 42, from a situation with only single article capacity to one with only double, or larger, article capacity. The preferred arrangement provides a flexible ratio of single and double sized stations, a previously unavailable feature. The owner of the storage rack 20 selectively positions the rods in the proper stations 42 to conform to the articles being stored.

Referring now to FIGS. 1 and 7, the preferred support member is a unitary V-shaped member 44 sized to contact, and be supported by, all three columns 24 at once. In this way, the aforementioned rods 40 join at a junction 45 to define legs 46 of the member 44, which legs are supported at their front ends by the front columns 24a, 24b. An apex 48 of the V-shaped member 44 is thus supported by the rear column 24c. The joining of the supporting rods 40 in this manner results in improved stability and strength and facilitates assembly.

As seen in FIG. 7, the legs 46 of the V-shaped member 44 are bowed inward. Preferably, the legs 46 are cylindrical in cross-section. The resulting arcuate shape facilitates bending of the legs 46 when reconfiguring the stations 42. The forward ends 50 of the legs 46 include reduced diameter tabs 52a, 52b, and a tab 54 of the same size as the front tabs extends rearwardly from the junction 45. The three tabs 52a, 52b and 54 are sized to fit in the cylindrical cavities 56 in the columns 24. A series of cavities 56 evenly spaced apart and at corresponding heights are drilled into each column 24. In the horizontal station 42 arrangement of FIGS. 1-3, the three tabs fit in any three cavities 56 at the same elevation. To change the angle of display, the rear tab 54 of each of the V-shaped members 44 is simply removed from one cavity 56 and placed in a lower cavity, the relative spacing as shown in FIG. 4.

The V-shaped members 44 are constructed from a lightweight, flexible, easily molded material such as polypropylene. Other flexible materials, such as metal, may be substituted depending on the application, aesthetic value or other considerations. Advantageously, the resilient nature of the V-shaped members 44 allows the legs 46 to be bent to shorten the distance between the apex 48 and front ends 50. Thus, the members 44 may be biased inward to fit between the columns 24 whereupon the legs 56 are released, flexing outward so that the tabs 52, 54 may be inserted into the cavities 56.

The legs 46 are sized slightly longer than the distance between the rear column 24c and either of the front columns 24a or 24b. Preferably, the legs 46 are long enough to allow the tabs 52a, 52b to fit into two cavities 56 at the same elevation in the front columns 24a, 24b while the rear tab 54 extends sufficiently within either of the next two lower cavities 56 in the rear column 24c to support an article thereon. Then, the rear tab 54 can be retracted from either of the lower cavities 56 and raised to the higher cavity, at the same elevation of the front cavities. In this way, the member 44 is large enough to fit in an angled relationship between the columns 24 (FIG. 6), yet is flexible enough to be bent between cavities 56 at the same level (i.e., the same vertical distance above the base), which are closer together.

The V-shaped members 44 are preferably sized to fit between the appropriate cavities 56 in an uncompressed state when oriented at an angle of 20°. In this arrangement, the shoulders 58 just contact the rims of the cavities 56. The members 44 are thus slightly compressed to fit between the appropriate cavities 56 when oriented at an angle of 10°. The flexibility and arcuate shape of the legs 46 absorbs such a compressive force. Furthermore, the members 44 are compressed even more when oriented at a horizontal angle, the legs 46 bending slightly further. The change in span between the cavities 56 in the front columns 24a,b and the cavity in the rear column 24c for the three orientations is relatively small, given the total span distance. Due to the design of the members 44, the compression imposed upon the legs 46, and associated force necessary to remove the tabs 52, 54 from the cavities, is small as well. Also, the preferred polypropylene construction material gives the members 44 the required flexibility for easy removal and installation when reconfiguring the storage spaces in the rack 20.

A compressive force is exerted on the columns 24 by shoulders 58 surrounding each tab 52, 54. The shoulders 58 thus provide a stop for the member 44 so that it will not jam or otherwise stick in the cavities 56. Advantageously, the tabs are sized smaller than the cavities 56 for ease of removal. Furthermore, the relative sizes of the tabs 52, 54 and cavities 56 allow for some misalignment therebetween, such as is the case when the stations 42 are angled, as in FIG. 6.

In an alternative arrangement, the members 44 are in a relaxed state when oriented horizontally. The tabs 52, 54 are of a sufficient length to engage the appropriate cavities when the members 44 are angled and the span between the cavities 56 in the front columns 24a,b and the cavity in the rear column 24c is enlarged. At an angled orientation, therefore, the shoulders 58 will no longer impart a compressive force on the cavities 56, and the members 44 will be simply supported therein.

Figure 8:
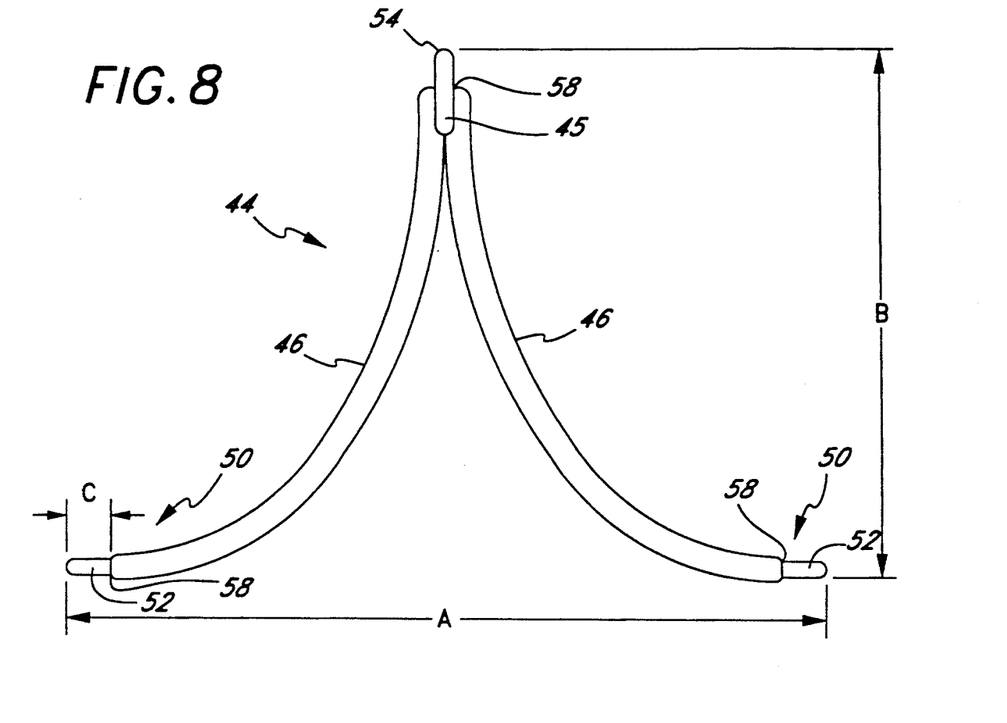
FIG. 8 is a top plan view of an alternative V-shaped support member for compact discs.

In the embodiment illustrated in FIG. 8, a modified V-shaped member 44a has a total width A spanning the front two columns 24a, 24b of approximately 5.55 inches (141 mm). The member 44a preferably has a depth B of approximately 4.00 inches (101.5 millimeter). Additionally, each tab 52, 54 has a length C of approximately 0.26 inches (or 6.5 mm). Thus, a preferred depth of the cavities 56 may be approximately 0.3 inches (10 mm) to fully receive the tabs 52, 54. The thickness of each of the legs 46 is approximately 0.20 inches (5 mm) and the thickness of the tabs 52, 54 is approximately 0.12 inches (3 mm).

The distance between the cavities 56 in the front two columns 24a, 24b is preferably equivalent to the distance between the shoulders 58 on each of the front legs 46 of the member 44a. This distance is approximately 5.04 inches (128 millimeter). Thus, the tabs 52 may be inserted into cavities 56 in the front two columns 24a, 24b so that the shoulders 58 just rest against the corners of the cavities. Of course the flexible legs 56 must be bent inward somewhat to reduce the distance between the tabs 52 and allow them to be inserted into the cavities 56. The distance in a line perpendicular to the front edge 28 of the rack from the cavities 56 in the front two columns 24a, 24b to the cavity in the rear column 24c is approximately 3.64 inches (92.5 mm). Thus, when the V-shaped member 44a extends between three cavities 56 at the same elevation in the columns 24, the shoulders 58 abut the edges of the cavity 56 in the columns 24 in a state of compression. Such an arrangement is shown for the V-shaped member 44 in FIG. 7.

The dimensions given above in reference to FIG. 8 may also apply to the V-shaped member 44 shown in FIG. 7. The member 44a of FIG. 8 only differs in that the front tabs 52 terminate at a perpendicular angle to the rear tab 54. Thus, the cavities 56 in the front columns 24a,b must also be aligned perpendicular to the cavities in the rear column 24c. In this configuration, the legs 46 of the V-shaped member 44a are more easily squeezed together, as the tabs 52 then retract straight out of the cavities 56 in the same direction the legs are traveling.

Changing positions of the members 44a is facilitated as the legs 46 are simply squeezed together, the tabs 52 retracted from the cavities in the front columns 24a,b, and then replaced in cavities above or below the original ones by releasing the legs and allowing them to spring outward, the tabs extending straight into the new cavities. Another advantageous method of changing the orientation of the members 44a involves pulling the rear tab 54 from the rear cavity by compressing the legs 46 and pivoting the member about the front tabs 52 until the rear tab is positioned over a second cavity, whereupon the member is released allowing legs to relax which pushes the rear tab into the new cavity.

The arcuate shape of the legs 46 of both member 44 and 44a provides a stable support for CD's inserted at the front of the rack ensuring a quick and easy replacement of CD's into the rack, and also allowing CD's to be partially pulled from between flexible members to protrude from the front of the rack. In other words, the inward curving legs 46 define a planar surface or shelf near the front of the rack on which the CD's are supported prior to full insertion. To define such a planar surface, the curvature of the legs 46 may be constant or may change from the front ends 50 back to the apex 48. In the embodiment shown in FIG. 7, the front tabs 52 make an angle of approximately 120° with the rear tab 54 and the curvature of the legs 46 is substantially constant from the front ends 50 to the apex 48. In the embodiment shown in FIG. 8, however, the radius of curvature of the legs 46 increases from the front ends 50 to the apex 48. The front tabs 52 of the member 44a initially extend in a substantially perpendicular direction relative to the rear tab 54. Thus, the cavities 56 in the front two columns 24a,b also open toward each other in a perpendicular direction to the cavities in the rear column 24c.

Figure 9:
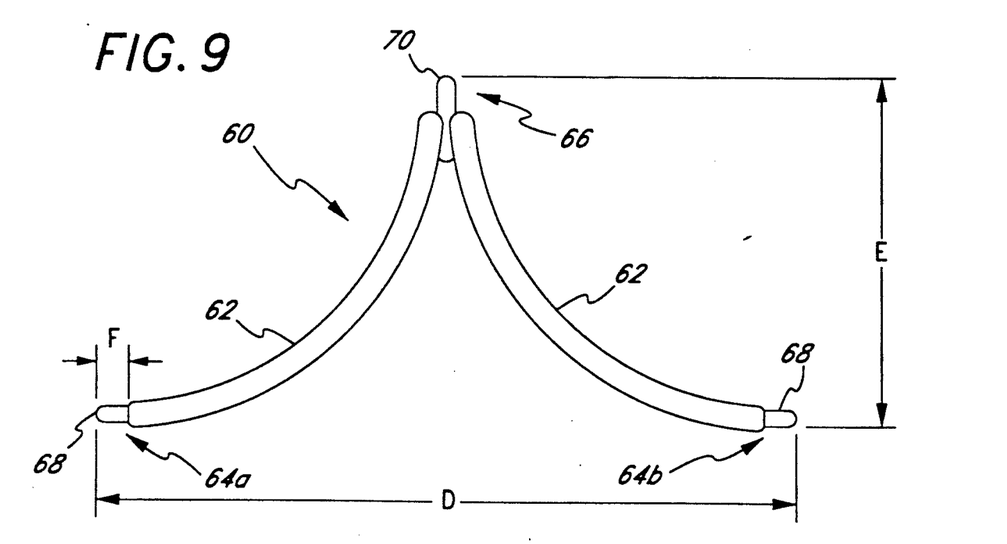
FIG. 9 is a top plan view of a V-shaped support member for supporting audio cassettes.

In a further embodiment of the flexible member 44, a member 60 used for storing audio cassettes is shown in FIG. 9. The member 60 includes similar legs 62 and apex junction 66 as in the flexible member for compact discs. The span D between the front ends 64a, 64b is approximately 5.08 inches (129 mm). The depth E between the front ends 64 and the apex 66 is approximately 2.4 inches (61 mm). The length F of the tabs 68, 70 is approximately 0.24 inches (6 mm). The approximate span between the cavities 56 in two front columns 24a, 24b for a rack for audio cassettes is approximately 4.61 inches (117 mm). The distance along a line perpendicular to the front edge of the audio cassette rack from the center of the cavities 56 in the front two columns 24a, 24b to the beginning of the cavity in the rear column 24c is approximately 2.01 inches (51 mm). The thickness of the legs 46 of the flexible member 60 is approximately 0.16 inches (4 mm). The thickness of each of the tabs 52, 54 of the member 60 is approximately 0.12 inches (3 mm).

These dimensions are given as examples only and are not meant to be limiting for the members 44a and 60. Likewise, other articles may be stored in the storage rack 20 of the present invention with the size of the flexible members used adjusted accordingly. For example, video tapes are substantially wider than either audio tapes or compact discs and thus the span between the front two ends of the flexible members would be increased.

The steps in making the improved storage rack will now be described. Wood boards of approximately 0.984 inch (25 mm) thickness are cut to size and their edges rounded to form the base 22 and top 26. The dead-end holes 32 for the columns 24 are drilled in corresponding locations in the base 22 and top 26. The cavities 56 for receiving the tabs 52, 54 of member 44 are drilled in initially square cross-section wood rods. Advantageously, the cavities 56 are spaced 0.623 inch (16 mm) apart and the totality of cavities may be formed in only two drilling operations with a standard multi-bore drill press having spindles spaced apart 1.260 (32 mm). The rods are then cut to the proper column height and turned on a lathe to obtain an aesthetically pleasing cylindrical exterior of between approximately 0.866 and 0.984 inches (22-25 mm) in diameter. The columns 24 are then affixed into the appropriate holes 32 in the base 22 and top 26 with adhesive or other fastening means. Prior to assembly or afterwards the wood components receive a finish. Lastly, the flexible members 44 are inserted into the cavities 56 to provide the desired proportion of thin and thick article storage spaces.

Advantageously, the components of the storage rack 20 are easily assembled and, in one embodiment, the rack is sold inexpensively as a disassembled kit.

Although this invention is described in terms of a certain preferred embodiment, other embodiments that will be apparent to those of ordinary skill in the art are also within the scope of this invention. Accordingly, the scope of the invention is intended to be defined by the claims that follow.

I claim:

1. A storage rack, comprising:
   a base;
   a first upstanding column secured on said base;
   a second upstanding column secured on said base;
   a third upstanding column secured on said base, each of said columns defining a plurality of stations;
   a plurality of support members, each of said plurality of support members being sized and shaped to extend between one of said plurality of stations defined by said first upstanding column and one of said plurality of stations defined by said third upstanding column and to extend between one of said plurality of stations defined by said second upstanding column and one of said plurality of stations defined by said third upstanding column, wherein said plurality of stations comprise a row of cavities, each of said row of cavities sized and shaped to receive and retain a portion of one of said plurality of support members.

2. The storage rack of claim 1, wherein each cavity in said row of cavities in said first upstanding column is positioned a distance above said base equal to that of a corresponding cavity in said row of cavities in said second upstanding column.

3. The storage rack of claim 2, wherein said support members are sized and shaped such that said support members are capable of being retained within corresponding cavities in said first and second upstanding columns while being retained in either of two cavities in said third upstanding column.

4. The storage rack of claim 2, wherein said support members are sized and shaped such that said support members are capable of being retained within corresponding cavities in said first and second upstanding columns while being retained in any one of three cavities in said third upstanding column.

5. The storage rack of claim 3, wherein said plurality of support members comprise generally V-shaped resilient members.

6. The storage rack of claim 5, wherein each of said V-shaped members defines tabs at its extremities which are sized and shaped to be received and retained within said rows of cavities.

7. The storage rack of claim 6, wherein said tabs of said V-shaped members extend in approximately 120° to each other and are received and retained within correspondingly aligned rows of cavities.

8. The storage rack of claim 6, wherein said V-shaped members includes two front tabs extending in directly opposed directions from each other and a rear tab extending rearward at a 90° angle to both front tabs, wherein the tabs are received and retained within correspondingly aligned rows of cavities.

9. The storage rack of claim 5, wherein each of said V-shaped members comprises polypropylene.

10. The storage rack of claim 5, wherein each of said V-shaped members comprises a single piece.

11. A storage cabinet, comprising:
    a base;
    three upstanding shafts, each of said shafts defining a plurality of stations;
    a plurality of support members sized and shaped to be retained by one of said plurality of stations on each of said shafts, wherein said stations are positioned such that support members retained within adjacent stations are spaced apart a sufficient distance to support thin articles, said support members being manually removable to permit support members retained by non-adjacent stations to support thicker articles.

12. A storage cabinet as in claim 11, wherein said support members are manually adjustable to support articles at more than one angle.

13. A storage rack, comprising:
    a bottom plate defining three triangularly-spaced bores;
    a top plate defining three bores vertically aligned with said bores in said bottom plate;
    a first upstanding column received and retained in one of said bores in said bottom plate and a vertically aligned bore in said top plate;
    a second upstanding column received and retained in one of said bores in said bottom plate and a vertically aligned bore in said top plate;
    a third upstanding column received and retained in one of said bores in said bottom plate and a vertically aligned bore in said top plate, each of said columns defining a row of 16 mm apart spaced cavities; and
    a plurality of resilient V-shaped support members sized and shaped to be retained by one of said cavities in each of said columns, said support members capable of being secured in a position parallel to said bottom plate or in positions non-parallel to said bottom plate.

14. A storage rack as in claim 13, further comprising: stations defined by a group of three cavities, one cavity from each of said three columns, wherein said stations are positioned such that support members retained within adjacent stations are spaced apart a sufficient distance to support thin articles, and wherein said support members are manually removable to permit support members retained by non-adjacent stations to support thicker articles.

* * * * *